Patented Aug. 26, 1941

2,253,632

UNITED STATES PATENT OFFICE 2,253,632

PRODUCTION OF FINELY DIVIDED LEAD

Yurii E. Lebedeff, Metuchen, N. J., assignor to American Smelting and Refining Company, New York, N. Y., a corporation of New Jersey No Drawing. Application May 15, 1940, Serial No. 335,321

6 Claims. (Cl. 75—0.5)

In accordance with the present invention, there is provided a highly economical method for the production of lead powder directly from molten lead.

The invention is based upon the discovery that when lead which has been treated with alkaline earth metals for the removal of bismuth and which contains residual calcium and magnesium from the debismuthizing operation, is treated further while in molten condition with stearic acid there is produced a very large formation of finely divided particles, readily adapted for use as such, or for direct conversion into lead oxide for the production of lead compounds in those cases where the lead is dissolved in acids.

The invention as to its procedure and results will be understood more readily by reference to the following specific illustrative examples of the present improved process.

Example 1

There were melted in a cast iron metallurgical kettle, 209.3 lbs. of lead which had been treated previously with calcium and magnesium to remove bismuth, and which contained residual calcium and magnesium. This lead assayed Ca 0.048%, Mg 0.03%, Bi 0.017%, this bismuth being only incidental and taking no part in the process.

The melt-down dross was skimmed off, weighing 9.3 lbs., leaving the bath at even 200 lbs. To the molten bath there were added 100 gms. of stearic acid, the addition being made to the vortex created by a mechanical stirrer, and at 630° F.

A dry dross formed, which was skimmed at 630°–660° F. and which was composed of finely divided lead covered with a gray oily film. There were small inclusions of metallic lead and wet dross. The separated dross weighed 54.5 lbs.

A further addition of stearic acid (100 gms.) was made to the residual lead bath, as above, the addition being again to the vortex and at 630° F., the bath being skimmed after 3 minutes mixing time at 630°–660° F. This second dross weighed 28.0 lbs. and was of the same character as the first dross.

The residual bath was treated a third time with 100 gms. of stearic acid as the same manner as previously, there being separated this time a third dross weighing 55.8 lbs., which was principally finely divided lead and of the same character as the first two drosses that were separated.

The finely divided lead drosses in each instance consisted of small individual particles of lead coated with a thin oil film of material which had a high surface tension, or which increased the surface tension of the individual lead particles to the extent that the molten lead particles would not coalesce. Particles of molten lead, not covered with this film, minor amounts of which lead may be entrapped in the dross, were observed to run together and coalesce to form large pieces of lead when the dross was removed from the kettle.

The finely divided particles of lead are separable readily from the larger pieces of clean lead by breaking and screening the dross through a 20-mesh screen. Of the total dross, 75% was —20 mesh, and 25% was +20 mesh. However, when a screen analysis determination was attempted on the —20 mesh material, it was discovered that it could not be screened effectively owing to the tendency of the oily film on the particles to hold them together. This film was removed by washing with ether or carbon tetrachloride, using several washes of the latter to clean the particles thoroughly.

A screen analysis of the —20 mesh dross portion, washed with carbon tetrachloride, is as follows:

|  | Per cent |
| --- | --- |
| Through 20 on 40 mesh | 10.2 |
| Through 40 on 60 mesh | 23.9 |
| Through 60 on 80 mesh | 27.3 |
| Through 80 on 100 mesh | 12.7 |
| Through 100 on 200 mesh | 21.4 |
| Through 200 mesh | 4.5 |

Using 100 gms. of stearic acid, the following approximate weights of products were obtained:

On 20 mesh, 12.5 lbs. This is clean lead, and may be returned to the kettle.

—20 mesh 37.5 lbs., 85% of that being —40 +200 mesh.

It was found in practice that the best results are obtained when the stearic acid is added at a temperature between 635° F. and 700° F. The speed of stirring should be just sufficient to carry the stearic acid down into the vortex. The time of stirring is governed by the appearance of the dross formed, a thick heavy dross rising to the surface when the lead has been stirred sufficiently. About 3 minutes stirring generally is required in practice.

It is noted in operating the present process that the vapors from the stearic acid tended to burn, but this burning did not affect the formation of the dross. Also it was found that the stearic acid was taken into the lead faster when a baffle was placed at the side of the vortex so that a stream of lead is diverted into the vortex.

*Example 2*

It having been noted that, in Example 1 above, the lead used contained residual calcium and magnesium debismuthizing reagents, a run was made to investigate the effects of the absence of such reagents on the production of the finely-divided lead.

Consequently, 178.0 lbs. of refined lead, free from calcium and magnesium were melted in a metallurgical kettle, and 2.9 lbs. of melt-down dross were skimmed from the molten bath.

As in Example 1 above, the bath, 175.1 lbs., was treated with 100 gms. of stearic acid in accordance with the technique of Example 1. There separated only a black oily liquid, 0.4 lb. of which was removed. This liquid contained no lead.

Consequently, there were added to the bath 3 lbs. of a lead-calcium alloy, calculated to produce 0.05% of calcium in the metal bath. The lead-calcium alloy was added to the surface of the bath at 700° F., allowed to melt and was stirred in for 2 minutes at 680° F. The resulting reagent dross, 2.6 lbs., was skimmed off.

The resulting bath, now containing 0.05% Ca and free from magnesium, was treated with 100 gms. of stearic acid as described under Example 1. A dross was produced which weighed 2.7 lbs., and which consisted of soft gummy balls with metallic lead entrapped therein, with no production of the finely divided lead of Example 1 above.

In view of this failure and to check further thereon, the bath was treated with another addition of stearic acid under the same conditions as before, there resulting a second production of the gummy balls as was formed above.

This gummy material was skimmed, and in order to make up calcium losses in the bath, a further addition of 1 lb. of the lead-calcium alloy (3% Ca) was made to the bath at 700° F., being allowed to melt and stirred in for two minutes as before. An addition of 40 gms. of magnesium turnings was now made to the bath, being calculated to impart a magnesium content of 0.05% to the bath. The turnings were added to the vortex of the bath at 680° F. and stirred for two minutes, the resulting reagent dross being skimmed off from the bath. There were separated 3.9 lbs. of this reagent dross, and the remaining bath, 168.4 lbs., assayed Ca 0.055%, Mg 0.05%.

This bath, now containing both Ca and Mg, was treated with 100 gms. of stearic acid as before, and there then separated 52.3 lbs. of the finely divided lead dross described above under Example 1, and a further treatment of the bath with 100 gms. of stearic acid as before produced a further separation of 42.8 lbs. of this same finely divided lead dross.

*Example 3*

Example 2 above, indicated that in order to produce the desired finely-divided lead dross, the presence of magnesium is needed, but it did not indicate the necessity of the presence of calcium, and accordingly Example 2 was repeated in substance except for the initial absence of calcium when treated with stearic acid, only magnesium being present.

In accordance with this example, 184.5 lbs. of refined lead, free from both calcium and magnesium, were melted and the melt-down dross was skimmed, this melt-down dross weighing 0.5 lb.

To the bath (184 lbs.) were added 42 gms. of magnesium turnings, designed to give a Mg content of 0.05% in the bath. The magnesium was added to the vortex in the bath at 680° F. and stirred in for about 2 minutes. The reagent dross was skimmed at 660° F.

The remaining bath, 183.7 lbs. now assayed Mg 0.05%, Ca none. To this bath there were added 100 gms. of stearic acid, the addition being made to the vortex of the mixer at 635° F., and stirred for 3 minutes. The bath was skimmed at 630°–660° F., there being removed on skimming 0.09 lb. of black, oily liquid containing small amounts of metallic lead.

A further addition of 100 gms. of stearic acid was made to the bath under the same conditions, this second addition of stearic acid producing 2.5 lbs. of black, oily liquid containing some finely divided lead.

In view of this result a third addition of 100 gms. of stearic acid was made to the bath under the same conditions as before.

This addition produced 4.0 lbs. of the black, oily liquid described above, which contained again minor amounts of finely divided lead.

In view of the failure of the stearic acid to produce the desired dross of Example 1 above, with magnesium alone in the bath, there were next added to the bath 3 lbs. of Ca-Pb alloy, assaying 3% Ca, this amount being calculated to produce a calcium content of 0.05% in the bath. This alloy was added to the surface of the bath at 700° F., allowed to melt and then stirred into the bath for 2 minutes at 680° F. At this time there were added 15 gms. of magnesium turnings, which were added to the vortex in the bath at 680° F. and stirred into the bath for two minutes. The reagent dross was skimmed at 660° F., there being separated 3.6 lbs. of reagent dross.

The bath now assayed Ca 0.050%, Mg 0.060%.

This bath then was treated with 100 gms. of stearic acid under the same conditions as before, there being produced this time 51.2 lbs. of dross consisting of finely divided lead covered with an oily film, there being inclusions of minor amounts of metallic lead as explained in connection with Example 1.

These runs indicate that in order to produce the desired powdered lead product, the presence of small amounts of both calcium and magnesium is requisite. It is not necessary to maintain substantial amounts of these elements in the lead, the process having been operated with calcium and magnesium contents each between 0.01% and 0.1%. This range possibly may be extended, but with respect to the calcium it is not possible to incorporate more than about 0.1% in lead unless the temperature of the bath is raised to a comparatively high degree, which is detrimental to the formation of the finely divided lead dross. In practice it is found to be impracticable to operate at temperatures much above 700° F., about 650° F. being preferred, although the temperature may be dropped to about 635° F.

It is not known what is the mechanism of the reaction which is obtained in accordance with this invention, nor what is the function of the calcium and magnesium beyond the apparent necessity that both be present at the time that the stearic acid is added.

The results of the operation show that finely divided lead can be produced by stirring stearic acid into molten lead containing calcium and magnesium (preferably about 0.05% of each) at a temperature below 700° F. About 75% of the lead dross produced is below 20 mesh. The addition of 100 gms. of stearic acid to a 200 lb. kettle of lead containing 0.05% calcium and 0.05% magnesium produces approximately 50 lbs. of lead dross, about 37.5 lbs. of which will be —20 mesh. This result will be repeated upon continued treatments with fresh portions of stearic acid, although there may be a gradual depletion of calcium through repeated treatments, which ultimately would require replenishment in the bath.

The formation of the dross apparently occurs only when the lead bath contains both calcium and magnesium when it is heated with the stearic acid. The optimum temperature for adding the stearic acid is about 650° F., the lead bath being stirred just fast enough to carry the stearic acid down into the lead. The time of stirring is determined by the appearance of the dross.

The fine particles of lead in the dross are covered with an oily film, which can be removed by washing with a suitable solvent such as ether or carbon tetrachloride, the solvent being recovered in any suitable manner. It is found in practice that any clean lead trapped in the fine lead particle dross is removable very easily by screening.

What is claimed is:

1. The process of producing finely divided lead which comprises incorporating stearic acid in a bath of molten lead containing calcium and magnesium at temperatures not exceeding approximately 700° F., until a dross is produced, the said dross consisting essentially of finely divided lead.

2. The process of producing finely divided lead which comprises producing a bath of molten lead containing minor but effective amounts of calcium and magnesium, adding stearic acid to the said bath and incorporating the stearic acid in the bath at a temperature not substantially above 700° F., to produce a dross consisting essentially of finely divided lead.

3. The process of producing finely divided lead which comprises incorporating stearic acid in a molten bath of lead containing from about 0.01% to about 0.1% each of calcium and magnesium, at temperatures below approximately 700° F., thereby producing a dross consisting essentially of finely divided lead.

4. The process of producing finely divided lead which comprises incorporating stearic acid in a molten bath of lead containing from about 0.01% to about 0.1% each of calcium and magnesium at temperatures below approximately 700° F. thereby producing a dross consisting essentially of finely divided lead, and removing adhering oily material from the articles of the lead.

5. The process of producing finely divided lead which comprises intermixing stearic acid with a bath of molten lead containing approximately 0.05% of calcium and approximately 0.05% of magnesium and maintained at a temperature of approximately 650° F. thereby producing a dross consisting essentially of finely divided lead, and separating the dross from the lead.

6. The process of producing finely divided lead which comprises producing a bath of molten lead, adding calcium and magnesium to the molten bath to produce a content of calcium and magnesium in the bath ranging from approximately 0.01% to approximately 0.1% of each, dispersing substantial amounts of stearic acid in the molten bath at temperatures not exceeding approximately 700° F., and separating the resulting finely divided lead dross.

YURII E. LEBEDEFF.